United States Patent
Koide et al.

[11] Patent Number: 6,100,943
[45] Date of Patent: Aug. 8, 2000

[54] VEHICULAR DISPLAY DEVICE FOR DIRECTLY AND INDIRECTLY DISPLAYING INFORMATION

[75] Inventors: Nobuaki Koide; Yasuyo Matsumoto; Yozo Nishiura; Kensaku Takada, all of Nagoya, Japan

[73] Assignees: Harness System Technologies Research, Inc., Nagoya; Sumitomo Wiring Systems, Ltd., Mie; Sumitomo Electric Industries, Ltd., Osaka, all of Japan

[21] Appl. No.: 08/897,987

[22] Filed: Jul. 8, 1997

[30] Foreign Application Priority Data

| Jul. 9, 1996 | [JP] | Japan | 8-179074 |
| Jul. 9, 1996 | [JP] | Japan | 8-179087 |
| Jul. 22, 1996 | [JP] | Japan | 8-192232 |
| Dec. 17, 1996 | [JP] | Japan | 8-336752 |
| Jan. 8, 1997 | [JP] | Japan | 9-001391 |

[51] Int. Cl.⁷ ............... G02F 1/1335; G02B 27/14
[52] U.S. Cl. ................. 349/11; 349/57; 359/630; 345/7
[58] Field of Search .............. 349/11, 57; 359/629, 359/630; 345/1, 7; 340/425.5, 815.4, 980

[56] References Cited

U.S. PATENT DOCUMENTS 4,635,033 1/1987 Inuaki et al. ................. 340/425.5

FOREIGN PATENT DOCUMENTS

| 0 005 245 | 11/1979 | European Pat. Off. |
| 0 200 407 | 12/1986 | European Pat. Off. |
| 0 312 094 | 4/1989 | European Pat. Off. |
| 0 340 485 | 11/1989 | European Pat. Off. |
| 0 370 640 | 5/1990 | European Pat. Off. |
| 2 227 544 | 11/1974 | France |
| 2 386 093 | 10/1978 | France |
| 1 772 014 | 6/1970 | Germany |
| 31 20 601 A1 | 12/1982 | Germany |
| 56-96446 | 8/1981 | Japan |
| 59-121744 | 7/1984 | Japan |
| 61-238014 | 10/1986 | Japan |
| B2-63-53046 | 10/1988 | Japan |
| U-4-16861 | 2/1992 | Japan |
| Y2-5-38990 | 10/1993 | Japan |
| WO 86/05648 | 9/1986 | WIPO |
| WO 89/02611 | 3/1989 | WIPO |
| WO 89/03059 | 4/1989 | WIPO |
| WO 96/19746 | 6/1996 | WIPO |

*Primary Examiner*—Kenneth Parker
*Attorney, Agent, or Firm*—Oliff & Berridge, PLC

[57] ABSTRACT

A display device for a transportation includes: a display unit displaying a display image on front and rear face sides, the display images displayed on the rear face side being in mirror image relationship with each other; and an optical member for inverting the display image displayed on the rear face side; wherein the display image displayed on the front face side is directly seen by a driver and the display image displayed on the rear face side is inverted by the optical member, so as to see in the same direction of the display image displayed on the front face side. The above display unit may be constituted by a light source having plural color spectra; an attenuation filter in which a transmittance for light emitted from the light source can be partly changed by an external signal; and a transparent light guide plate which guides light emitted from the light source to at least one of front and rear faces of the attenuation filter.

16 Claims, 16 Drawing Sheets

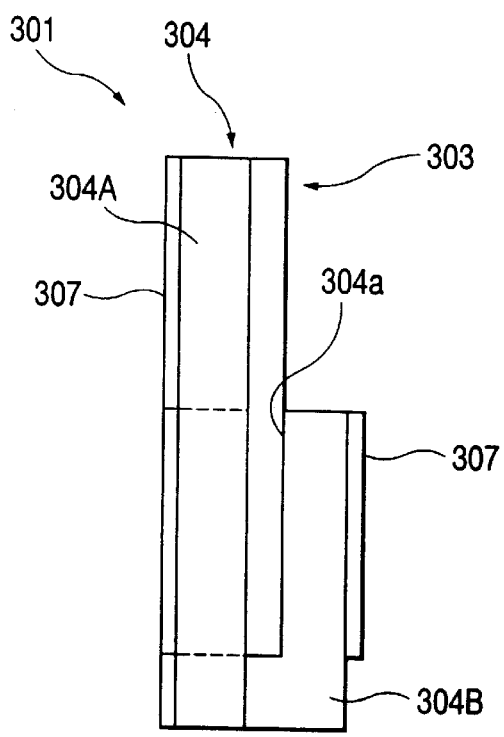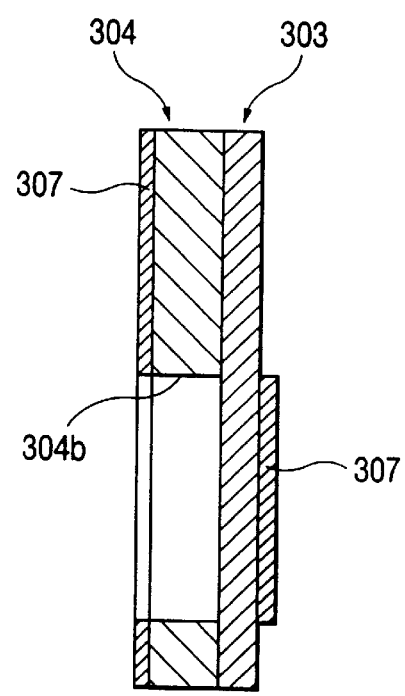

VEHICULAR DISPLAY DEVICE FOR DIRECTLY AND INDIRECTLY DISPLAYING INFORMATION

BACKGROUND OF THE INVENTION

1. Field of the Invention

The invention relates to a display device, and particularly to a display device which conducts an instrument indication, for example, a speed meter or a tachometer, a warning indication, a facility indication, and the like in transportation such as an automobile, an airplane, and a ship.

2. Description of the Related Art

Among display devices of such a kind, for example, an instrument panel of an automobile or the like is configured by a combination of mechanical meters having a pointer, and warning lamps using an electric bulb.

Such a mechanical meter is complicated in structure and has a number of parts. The production of a mechanical meter requires much labors. Furthermore, the complicated structure causes much troubles.

Electrical specifications of a mechanical meter require a large number of wires. Since there is not a space sufficient for laying conventional electric wires of such a large number in bundle, an expensive flat wiring member such as a PCB (Printed Circuit Board) or an FPC (Flexible Printed Circuit board) is usually used.

As another display device, a two-sided display unit which belongs to the field of a so-called flat display and which can conduct display on both the front and rear faces is used. Conventionally, as described in Japanese Patent Unexamined Publication No. SHO. 59-121744, a two-sided display unit of this kind is configured by a fluorescent display tube having a structure in which an anode is made nontransparent or display light is blocked by a nontransparent filter, thereby selectively displaying display patterns of the front and rear face sides.

In another display unit, as described in Japanese Utility Model Unexamined Publication No. HEI. 4-16861, a fluorescent display tube has a structure in which display light is blocked by a nontransparent mask member, thereby selectively displaying display patterns of the front and rear face sides.

However, each of the prior art two-sided display units disclosed in the publications has a structure in which a self-luminous element consisting of a fluorescent display tube is used, and hence has a defect that the two-sided display unit itself is expensive.

In such a display device for a vehicle, recently, attempts have been made to form a virtual image of a display image of a display unit under magnification through an optical element such as a lens, in place of viewing a real image displayed on the display unit, thereby improving the visibility and hence enhancing the value as a product.

An example of a system which conducts a display in such a manner and is widely used is the HUD (Head Up Display) system. In an HUD used in an automobile, an image of a display element irradiated by a light source is projected onto a combiner which is disposed on the side of the driver so as to face a lower region of a windshield glass, or on the windshield glass itself, and a display is conducted by using the combiner or the windshield glass (hereinafter, represented by the combiner) as a screen. When display contents such as shown in FIG. 23 of an instrument board disposed in a front-and-lower portion of the driver's seat are displayed on a projection face of the combiner by the HUD, the driver can see the display contents of the instrument board with looking ahead, without downward directing the line of sight while driving the automobile, because the combiner is disposed on the upper face of an instrument panel. From the view point of traffic safety, this display is very advantageous particularly for a person such as an old person or a beginner who is entirely devoted to observation of the road state during driving.

An HUD is used as an auxiliary display device for the instrument board, a navigation system, or the like. In order to conduct a display by means of the HUD, a display device dedicated to the HUD must be prepared. Consequently, an automobile equipped with an HUD in addition to an instrument board is very expensive.

In order to reduce the cost, it may be contemplated to employ a configuration in which an instrument board is not disposed and display contents of an instrument board are incorporated into an HUD so that a display is conducted by using the HUD only. However, this configuration has the following drawback. In the case where a wide field of view is to be obtained in a windshield glass, a combiner obstructs the field of view. When a projection face 15 of a combiner 14 is laid down so as to turn down the display as shown in FIG. 24, the driver cannot get information produced by the instrument board and hence an accident may be caused.

Although a parking brake is pulled and the HUD conducts a warning indication on the combiner 14, for example, the display may be turned down in order to obtain a wide field of view as described above. In this case, the driver continues to drive the automobile without being aware of the warning contents relating to the parking brake.

Therefore, an instrument board which always conducts a display, or an indicator equivalent to such an instrument board must be disposed. Among the display contents of such an instrument board, particularly, warning indications such as the above-mentioned parking brake warning, charge warning, ABS warning, and engine control unit warning are preferably performed also on the projection face 15 of the combiner 14 in view of safety of an old person or a beginner.

As described above, however, an automobile equipped with both an instrument board and a display device dedicated to an HUD is very expensive.

Further, when plural display information sets are collectively displayed in one region, recognizability is impaired. In the case where a display of a digital clock and a display of the travel distance which is similarly in the digital form are juxtaposed, for example, the displays may be confusedly erroneously recognized. Such a configuration may be sometimes inappropriate also from the viewpoint of the design of an automobile.

Moreover, the opening of the instrument panel itself is reflected on the windshield glass, and the display unit inside the instrument panel is reflected on the windshield glass through the opening. There arises a problem in that such reflected images obstruct the view of the driver.

SUMMARY OF THE INVENTION

Consequently, it is a problem of the invention to convert a prior art expensive display system which surely informs the drivers of warning contents and displays information of transportation produced by an instrument board in conjunction with a display device dedicated to an HUD, into an inexpensive display system.

In order to solve the problem, according to the invention, a display device for a transportation includes: a display unit displaying a display image on front and rear face sides, the display images displayed on the rear face side being in mirror image relationship with each other; and an optical member for inverting the display image displayed on the rear face side; wherein the display image displayed on the front face side is directly seen by a driver and the display image displayed on the rear face side is inverted by the optical member, so as to see in the same direction of the display image displayed on the front face side.

According to this configuration, the display unit can function as both an instrument board and a display device such as an HUD.

The above display unit may be constituted by a light source having plural color spectra; an attenuation filter in which a transmittance for light emitted from the light source can be partly changed by an external signal; and a transparent light guide plate which guides light emitted from the light source to at least one of front and rear faces of the attenuation filter.

The two-sided display unit may further include a color filter on at least one of the front and rear faces of the attenuation filter, the color filter selectively allowing a part of the color spectra of the light source to be transmitted through the color filter, or a mask which partly shields the attenuation filter is disposed on the light guide plate, thereby selecting a display pattern to be seen from a front face side of the attenuation filter and a display pattern to be seen from a rear face side of the attenuation filter, among display patterns formed in the attenuation filter, in a required manner.

BRIEF DESCRIPTION OF THE DRAWING FIGURES

FIG. 17 is a side view of the seventh embodiment;

FIG. 19 is a side section view of the eighth embodiment;

DETAILED DESCRIPTION OF THE PREFERRED EMBODIMENTS

[First Embodiment]

Hereinafter, an embodiment of the invention will be described with reference to the drawings.

The embodiment described below is an example wherein the display, which is conducted by an instrument board in the prior art, is conducted by a fluorescent display tube of the front and rear or two-sided display type. Alternatively, a display unit of another kind such as a liquid crystal display device may be used.

Figure 1A:
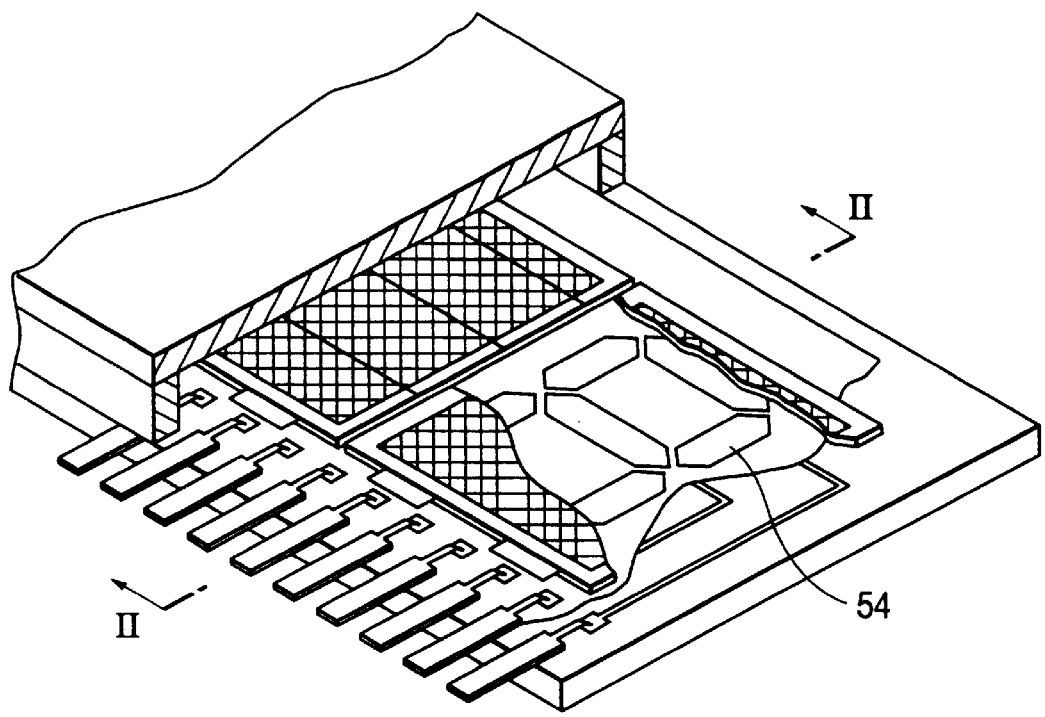
FIG. 1A is a perspective view showing the main portion of a usual fluorescent display tube, partly in section.
Figure 1B:
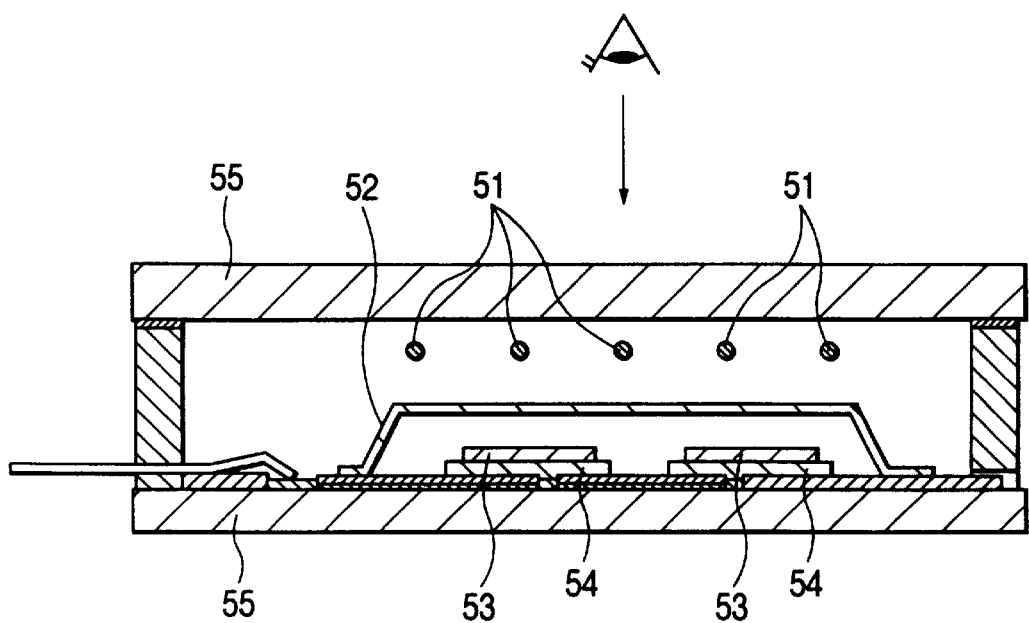
FIG. 1B is a section view taken along line II—II of FIG. 1A.

In a usual fluorescent display tube, as shown in FIG. 1, filaments 51 are disposed in the display tube, fluorescent members 53 in grids 52 are heated by the filaments 51 so as to emit light, and the fluorescent members 53 emit light so as to draw characters or symbols (segments 54).

Figure 2:
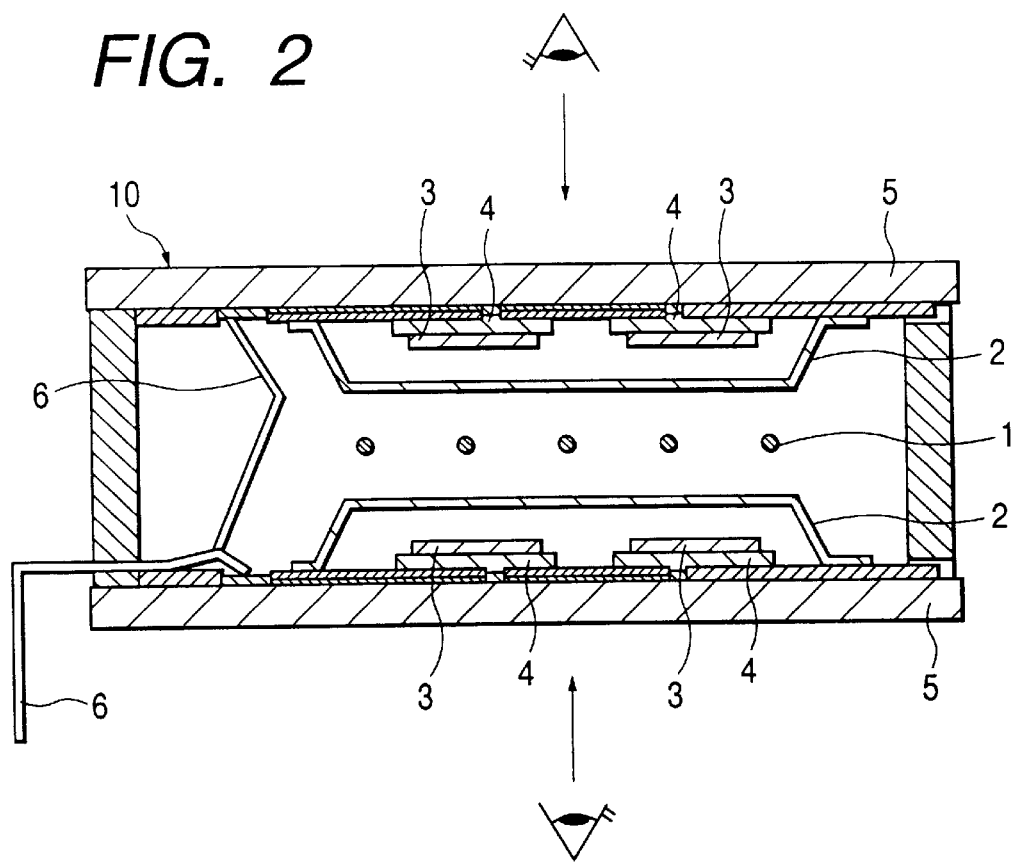
FIG. 2 is a section view of a two-sided fluorescent display tube used in a first embodiment.

As shown in FIG. 2, in the two-sided fluorescent display tube used in the embodiment, grids 2 in which fluorescent members 3 are encapsulated are arranged on both the front and rear sides of the display tube, and the front and rear sides of each segments 4 forming a display image can be directly seen from the outside of the fluorescent display tube 10. When the front and rear segments 4 are directly seen in the respective directions, they are in mirror image relationship with each other. When the display image formed by the segments 4 on one side is inverted by a reflecting mirror, therefore, an image which is identical with the display image of the other side is obtained. In the figure, a numeral 1 designates filaments, a numeral 5 designates glass substrates, and a numeral 6 designates lead wires.

Figure 3:
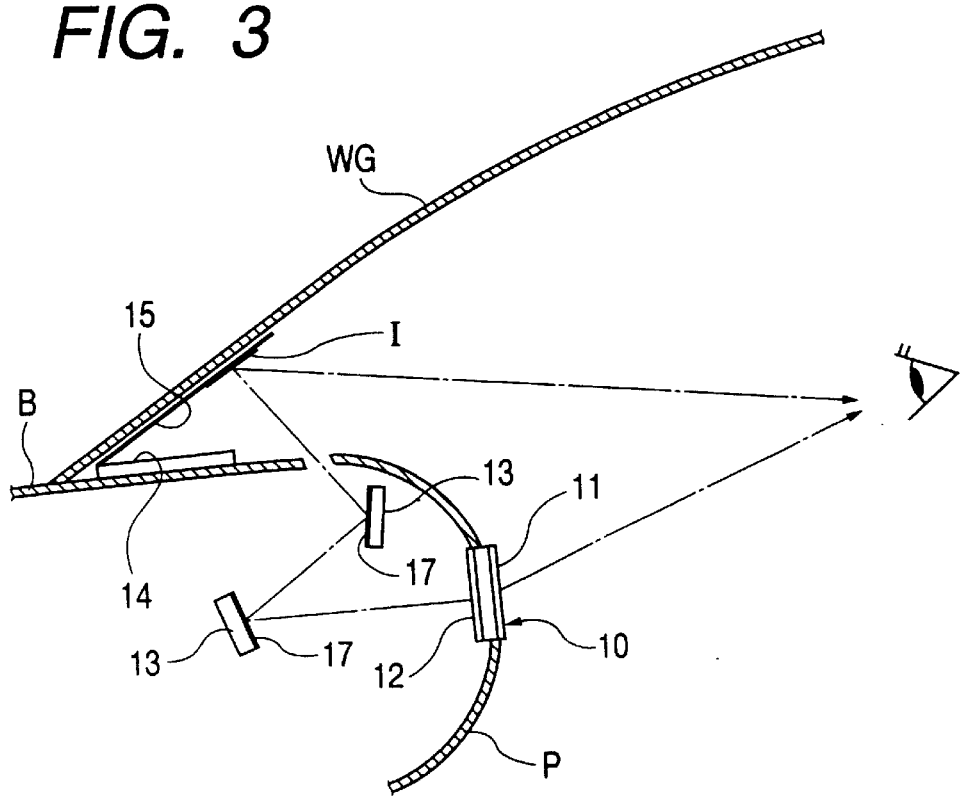
FIG. 3 is a view showing the principle of the first embodiment.
Figure 4:
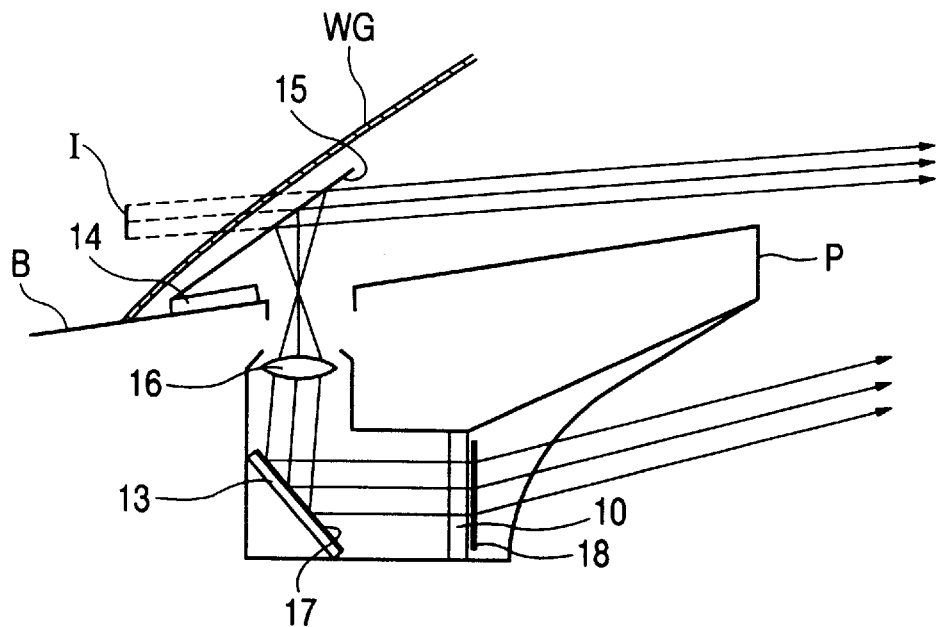
FIG. 4 is a view showing the operation of the first embodiment.

The embodiment employs the principle described above. Namely, as shown in FIGS. 3 and 4, the side indicating the display form (hereinafter, referred to as "regular display") from which, when the driver directly sees the display tube, the contents of the display can be read in a usual manner is set as the front screen 11 of the fluorescent display tube 10. The side on which a mirror image of the regular display appears is set as the rear screen 12. The mirror image displayed on the rear screen 12 is inverted by a combination of a reflecting mirror 13 and a lens 16 to form a regular display, and the regular display is projected onto the projection face 15 of the combiner 14. As a result, the regular display can be directly seen in both the forms of a virtual image I projected onto the projection face 15 of the combiner 14 and the real image on the front screen 11 of the fluorescent display tube 10.

Figure 5:
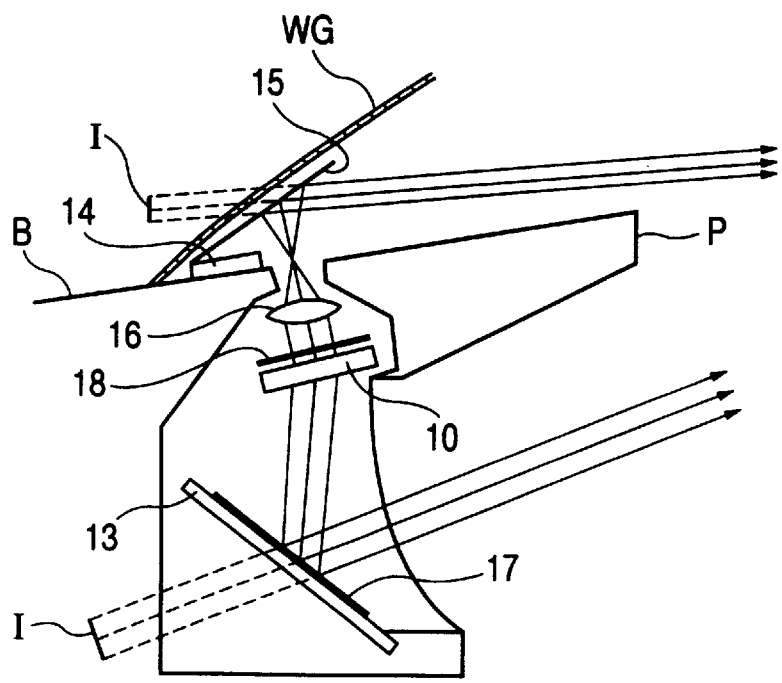
FIG. 5 is a view showing the operation of the first embodiment.

As shown in FIG. 5, alternatively, the reflecting mirror 13 may be used so that also the display image on the front screen 11 of the fluorescent display tube 10 is seen in the form of a virtual image. In the alternative, the virtual image can be seen in a magnified size, and the focal point can be set at a distant position. Therefore, the image is easy to see and its recognizability is enhanced.

In FIGS. 3, 4, and 5, WG designates a windshield glass, B designates the body of the vehicle, and P designates the instrument panel.

As described above, in the embodiment, the system which was conventionally configured by an expensive display device dedicated to an HUD and an instrument board is realized by the inexpensive fluorescent display tube 10 and the reflecting mirror 13 which are popularly used. Therefore, it is possible to construct an HUD system which is identical in function with a system of the prior art but is very low in production cost.

The display and non-display states of the combiner 14 can be switched over by changing the reflectivity of the reflecting mirror 13. In the embodiment, as shown in FIGS. 3 to 5, a liquid crystal film 17 is applied to one face of the reflecting mirror 13, thereby enabling the reflectivity of the reflecting mirror 13 to be adjusted by changing the light transmittance of the liquid crystal film 17.

In the embodiment, as shown in FIGS. 4 and 5, a liquid crystal shutter 18 may be disposed on the display face 11 or 12 of the fluorescent display tube 10. The display screen can be partially subjected to switchover of display and non-display states by the liquid crystal shutter 18.

According to this configuration, when an item of lower necessity of display is not displayed and only an item of higher necessity of display is displayed, the recognizability and warning ability of the item of higher necessity of display can be enhanced. When an item which has not been displayed is to be displayed, the item can be immediately switched over to the display state. In a conventional mechanical meter having a pointer, such a partial switchover of display and non-display states of a display screen cannot be conducted.

As the liquid crystal shutter 18, a TN (Twisted Nematic) type one using a polarizing plate, or a light scattering type one may be used. In the latter one, high polymers are dispersed in liquid crystal molecules, and the light transmittance is changed by using light scattering of liquid crystals due to the high polymers. When light is allowed to be transmitted, a shutter using a polarizing plate produces a large loss due to light absorption of the polarizing plate. Therefore, the light scattering type liquid crystal shutter 18 which produces a reduced loss is preferably used. Usually, a TN type liquid crystal shutter produces a loss of about 50%, and the light scattering type liquid crystal shutter 18 produces a loss of about 20%.

In the adjustment of the light transmittance by means of the liquid crystal film 17, the on/off switching of the display and non-display states such as that of the liquid crystal shutter 18 can be conducted, and furthermore the light transmittance can be set to be any level between perfect transparency and complete nontransparency, thereby enabling the brightness of a projection image to be adjusted. Consequently, the brightness of the projection image may be changed depending on the time, or day or night so that the image can be seen at a brightness suitable for the situation.

Figure 23:
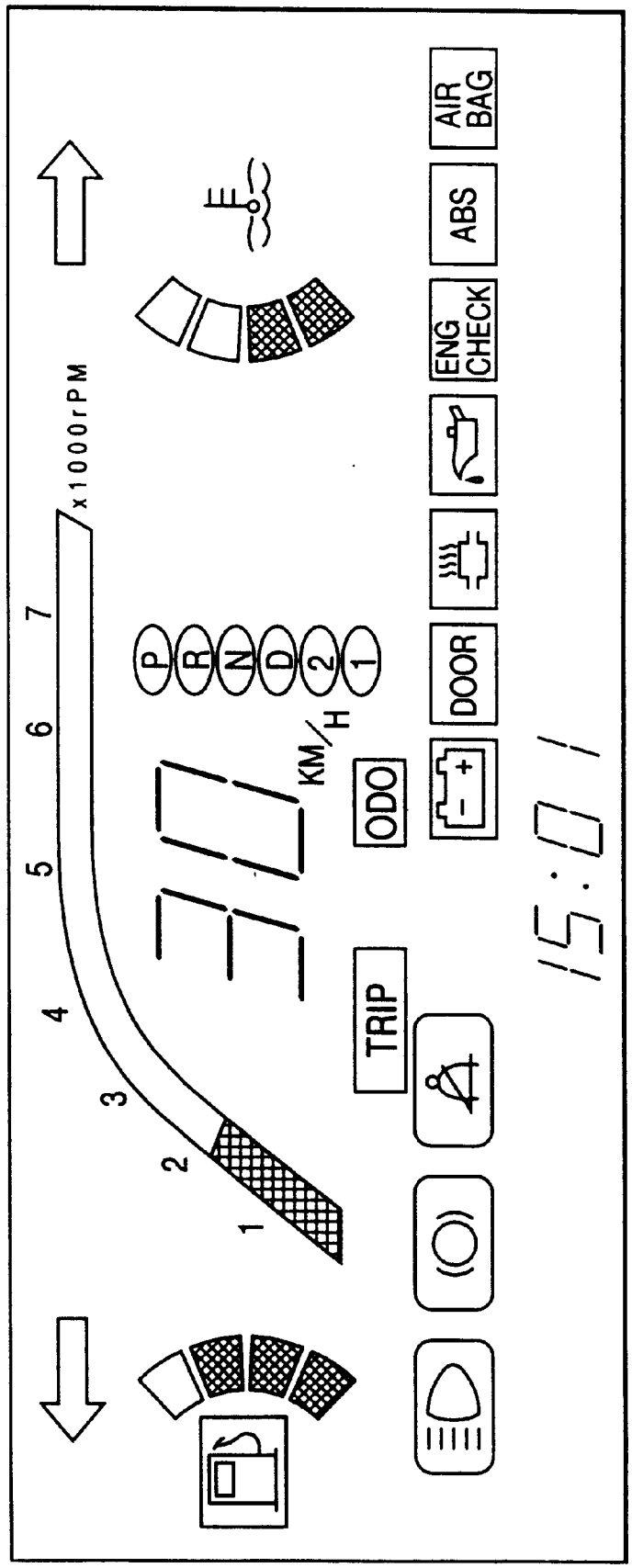
FIG. 23 is a view showing an example of an instrument board for an automobile.

Conventionally, the contents to be displayed on the combiner 14 are restricted to a speed meter, a fuel gauge, and the like which are to be frequently seen during driving. In the embodiment, in addition to these measured values, the contents of warning indications displayed on the instrument board (see FIG. 23) described in the column of the prior art are added to the display contents. All the display contents including the warning indications are listed in Table 1 below.

When also the contents of the warning indications are displayed on the combiner 14 in this way, both the fluorescent display tube 10 and the combiner 14 issue warning information. Even when the projection face 15 of the combiner 14 is laid down in order to ensure a wide field of view, therefore, the driver can surely notice the warning indication because the warning indication is conducted also on the front screen 11 of the fluorescent display tube 10.

TABLE 1

| | |
|---|---|
| speed meter | parking brake/brake fluid warning * |
| tachometer | sheet belt warning |
| engine temperature gauge | door warning |
| fuel gauge | residual fuel warning |
| odometer (travel distance) | exhaust gas temperature warning * |
| trip meter | oil pressure warning * |
| automatic-shift indicator | charge warning * |
| clock | engine control unit warning * |
| directional signal indicator | ABS warning * |
| high-beam indicator | air bag warning * |

Figure 6:
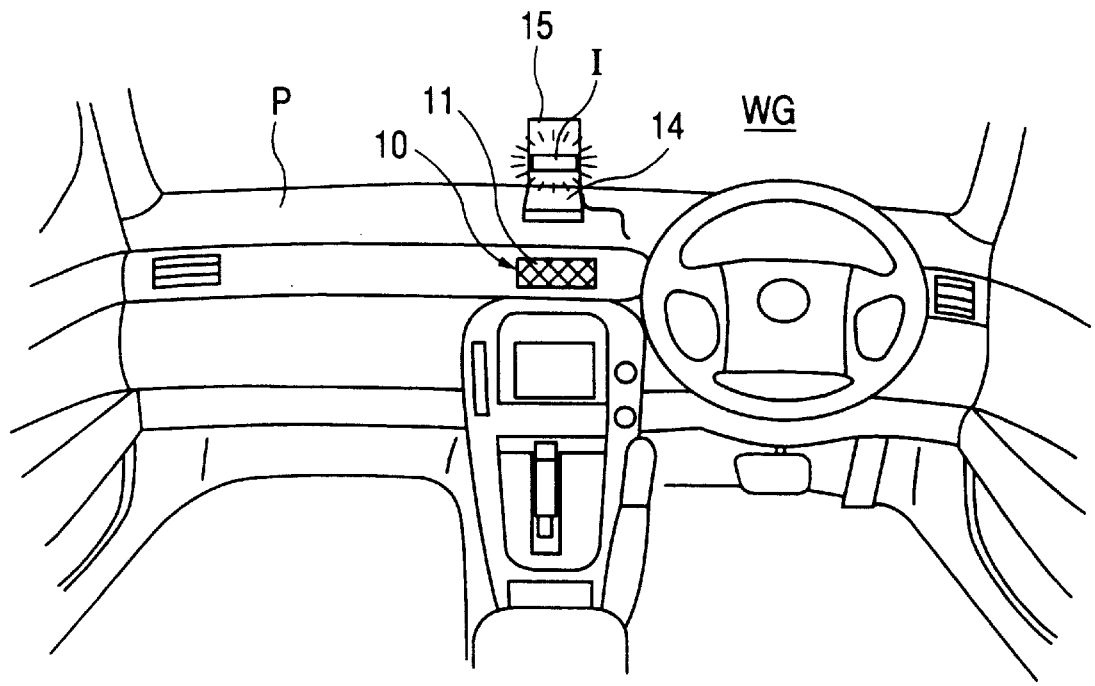
FIG. 6 is a view showing the operation of the first embodiment.

The display may be conducted in the following manner. When warning is to be displayed, as shown in FIG. 6, the warning indication is conducted only by the virtual image I on the projection face 15 of the combiner 14. Such a warning indication can attract more attention of the driver. In order to realize such a display, the luminance of the front screen 11 of the fluorescent display tube 10 is lowered and that of the rear screen 12 is raised. Consequently, the luminance of the inverted display (i.e., the virtual image I of the regular display) of the rear screen 12 which is displayed on the projection face 15 of the combiner 14 is higher than that of the front screen 11 of the fluorescent display tube 10, and hence the resulting state is relatively identical with the state in which only the display of the virtual image I on the projection face 15 of the combiner 14 is conducted.

Figure 7:
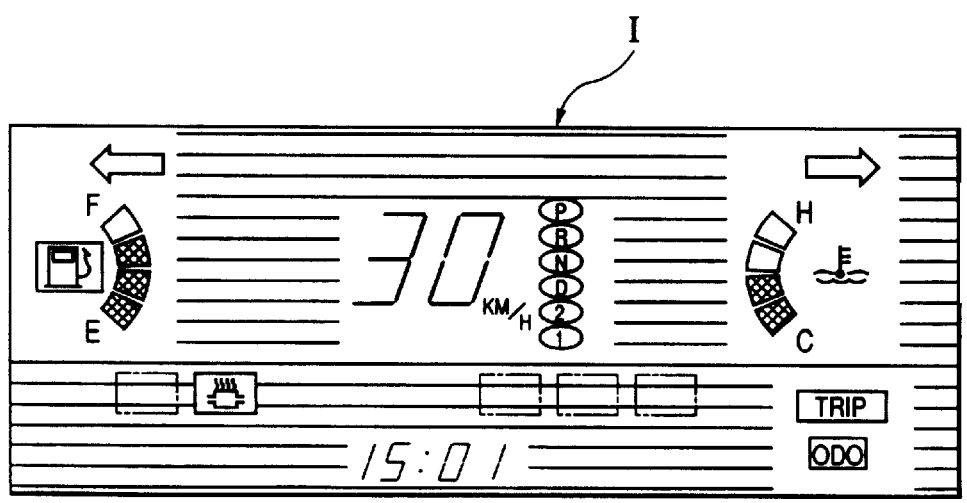
FIG. 7 is a view showing the operation of the embodiment.

In this display, as shown in FIG. 7, the luminance of the warning portion among the display contents on the projection face 15 of the combiner 14 may be made further higher than that of the surrounding so as to be distinct. In this case, the warning portion and the surrounding relatively enter the lighting and unlighting states, respectively, thereby further enhancing the warning effect. When the luminance is periodically changed, it is possible to realize the blinking operation. The warning contents in Table 1 above and affixed by mark (*) are particularly important. When warning of such contents is to be conducted, therefore, the contents may be caused to blink so as to attract the attention of the driver.

Also in the display on the front screen 11 of the fluorescent display tube 10 which is conducted by a real image, the luminance may be periodically changed, and also the period may be changed, thereby attracting the attention of the driver.

The configuration in which a warning indication is conducted only on the projection face 15 of the combiner 14 that is situated at a position higher than the instrument panel P may be applied also to the system which has been described in the column of the prior art and in which the instrument board and the display device dedicated to the HUD are used. In this case, the contents of the warning indication are incorporated into the display device dedicated to the HUD.

In the above, the case where the display is conducted on the projection face 15 of the combiner 14 is described. Alternatively, the combiner 14 may not be used, and the display may be conducted directly on the windshield glass WG. In the alternative, reflection of the combiner 14 on the windshield glass WG can be avoided, and poor appearance due to complex electrical wiring of the combiner 14 on the instrument panel P can be eliminated.

According to the first embodiment, a display unit in which a display image can be directly seen as a real image from the front and rear sides is used in place of an instrument board of the prior art. The side indicating the display form (regular display) from which, when the driver directly sees the display unit, the contents of the display can be read in a usual manner is set to be the front screen of the display unit. The side on which a mirror image of the regular display appears is set as the rear screen. The mirror image displayed on the rear screen is reflected by the reflecting mirror so as to impinge on the combiner or the windshield glass. As a result, it is possible to construct an HUD which is very inexpensive and which can exhibit the same function as that of the prior art that the regular display can be directly seen on both the combiner or the windshield glass and the front screen of the display unit.

Important display contents such as a warning indication are displayed on the combiner or the windshield glass. This does not cause the field of view to be moved, or the focal point to be changed. Therefore, the safety during driving can be enhanced.

[Second Embodiment]

Figure 8:
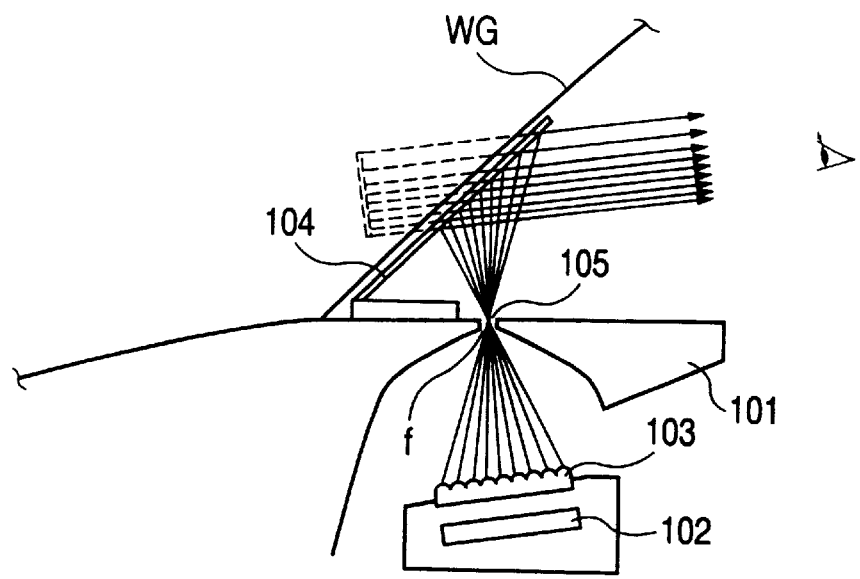
FIG. 8 is a diagrammatic view showing a second embodiment.

Hereinafter, an another embodiment of the invention relates to the improvement of the HUD system and will be described with reference to FIG. 8.

According to the embodiment, in the configuration of the HUD system, a vacuum fluorescent display tube (VFD) is employed as a display unit 102 which is disposed inside an instrument panel 101. A condenser lens 103 is disposed in the vicinity of the fluorescent display tube and on the side of a combiner 104. The condenser lens 103 causes light emitted from the display face of the fluorescent display tube to be condensed and inverted in the path to the combiner 104 disposed outside the instrument panel 101, so that, when the light reaches the combiner 104, an inverted and magnified image is projected.

On the other hand, an opening 105 is formed in the instrument panel 101 so as to allow the light of the fluorescent display tube to be emitted to the outside. In the invention, the optical specifications (the shape and the refractive index of the material) and the disposed position of the condenser lens 103, and the disposed position of the fluorescent display tube are set so that the focal position f where the light of the fluorescent display tube is condensed by the condenser lens 103 coincides with the position of the opening 105.

According to this configuration, the opening 105 coincides with the focal position f where the degree of spread of the light is minimum, and hence the size of the opening 105 can be made minimum. As compared with the prior art in which the opening 105 is designed so as to perform only the fundamental function of allowing light to be emitted through the opening, therefore, the size of the opening 105 is reduced to a minimum level. Consequently, the reflection of the opening 105 itself, and also that of the display unit 102 inside the instrument panel which is performed on the windshield glass WG through the opening 105 can be remarkably suppressed, thereby attaining an effect that the safety is enhanced.

Since the opening 105 can be made small, the appearance of the instrument panel 101 is not impaired.

In place of the fluorescent display tube used in the embodiment, another known display unit such as a liquid crystal display device or an electroluminescent display device may be used as the display unit 102 disposed inside the instrument panel 101.

[Third Embodiment]

Hereinafter, a display device which is an third embodiment of the invention will be described with reference to the FIGS. 9 to 12.

Figure 9:
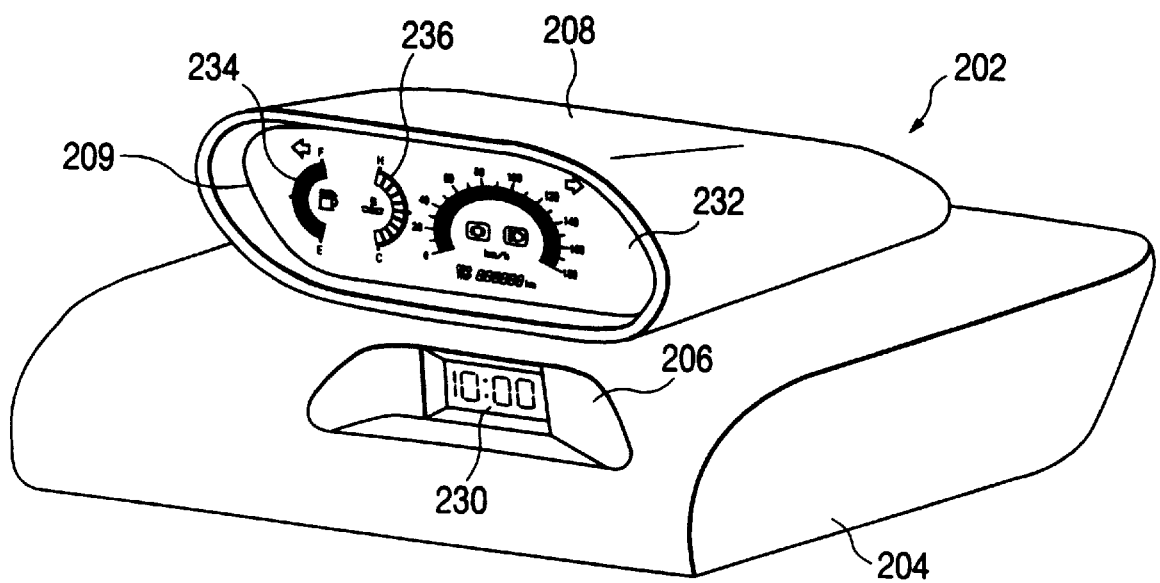
FIG. 9 is a perspective view showing a display device of a third embodiment.
Figure 10:
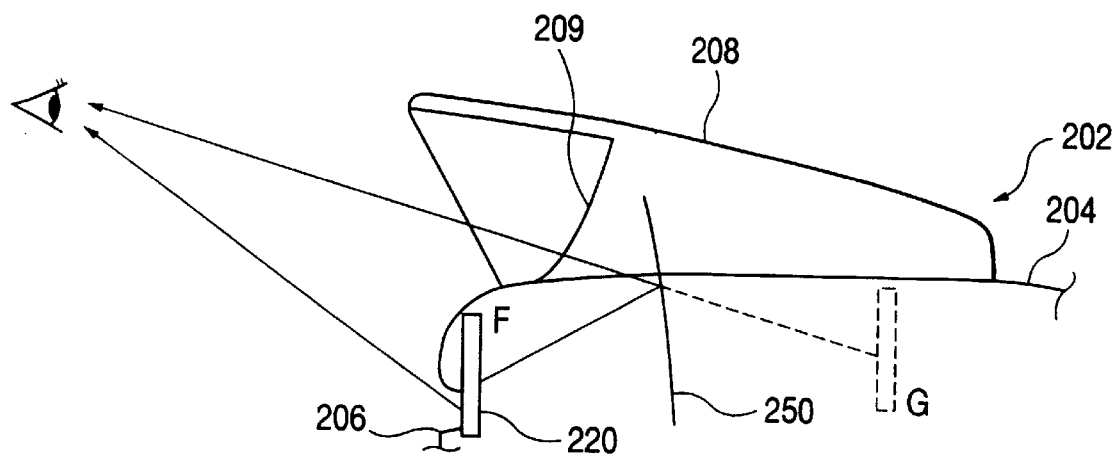
FIG. 10 is a section view showing the display device of the third embodiment.

As shown in FIGS. 9 and 10, the display device is used as a display device for an automobile and disposed on a dash board 202 in front of the driver's seat.

The dash board 202 is configured in the following manner. A display window 206 is formed in a front side face of the board body 204, and a digital clock 230 which functions as the first display information set is displayed in the window 206. A panel hood 208 having a cover glass 209 is formed above the display window 206. A speed meter 232, a fuel gauge 234, and the like which function as the second display information set are displayed as a virtual image.

The configuration will be described in more detail. A front-light-emitting fluorescent display tube (hereinafter, abbreviated as "FLVFD") 220 which functions as the display panel is attached to the back of the display window 206 inside the board body 204.

In the FLVFD 220, a glass substrate and thin film anode wirings are used so that light emitted from fluorescent members is transmitted through both the faces of the panel. A display information set formed by the fluorescent members is illuminatingly displayed on the front face of the panel, and a horizontally inverted display information set is illuminatingly displayed on the rear face.

Figure 11:
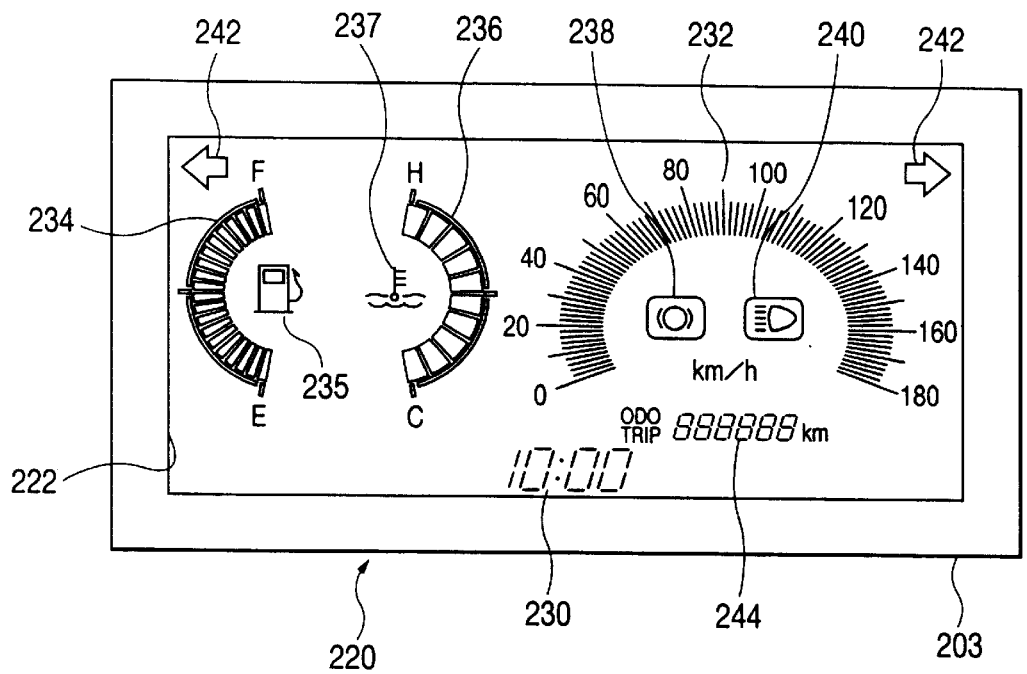
FIG. 11 is a front view showing a front-light-emitting fluorescent display tube used in the display device of the third embodiment.

On the FLVFD 220 used in the automobile, as shown in FIG. 11, information indicative of the running state of the automobile, i.e., the speed meter 232, the fuel gauge 234, fuel warning indication 235, a temperature gauge 236 for the engine coolant, temperature warning 237 thereof, warning indication 238 of the operation of a parking brake, an upper-beam indication 240, a turn signal indication 242, and an odometer 244 are displayed as the second display information set in a display frame 222, and information other than that indicative of the running state of the automobile, i.e., the digital clock 230 is displayed as the first display information set in a substantially lower center portion of the display frame 222.

Figure 12:
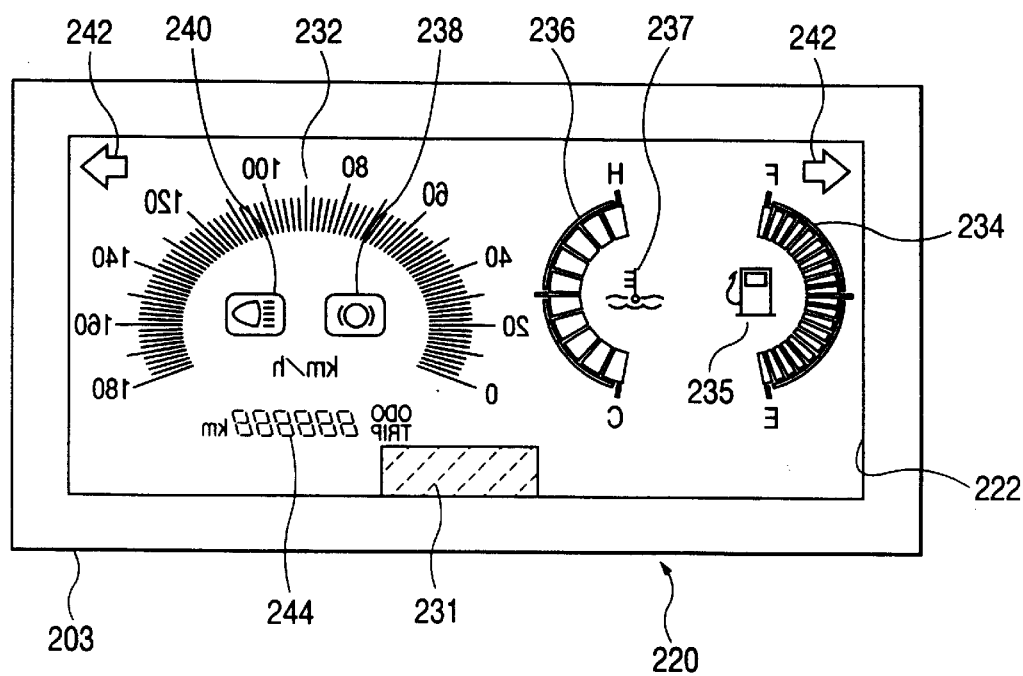
FIG. 12 is a rear view showing the front-light-emitting fluorescent display tube of the third embodiment.

When the FLVFD 220 is seen from the rear face side, as shown in FIG. 12, the first and second display information sets are displayed with being horizontally inverted. A shield film 231 is formed in a region of the rear face of the FLVFD 220 which corresponds to the digital clock 230, thereby inhibiting the digital clock 230 from being displayed on the rear face.

The FLVFD 220 is attached to the interior of the board body 204 in such a manner that the digital clock 230 disposed in the surface is exposed through the display window 206. The other information, i.e., the second display information set is covered by the board body 204 and hence the driver can directly see only the digital clock 230.

A reflecting mirror 250 is disposed on the rear side of the FLVFD 220 in the board body 204. The reflecting mirror 250 is attached at a position and a posture which, when the visual point of the driver is moved to the panel hood 208 and the driver sees the reflecting mirror 250, allow the driver to see a reflection of the rear face of the FLVFD 220. When the second display information set which is illuminatingly displayed on the rear face of the FLVFD 220 with being horizontally inverted is projected onto the reflecting mirror 250, the driver recognizes the information set in the form of a virtual image. In other words, the driver who sees the reflecting mirror 250 through the panel hood 208 recognizes the second display information set in the form of a virtual image at a position G which is symmetrical to the disposition position F of the FLVFD 220 with respect to the reflecting mirror 250. In this case, the second display information set which is displayed on the rear face of the FLVFD 220 with being horizontally inverted is further horizontally inverted by the reflecting mirror 250, and hence the driver can recognize the second display information set in the form of a regular image which is not horizontally inverted.

In the thus configured display device, the digital clock 30 displayed on the FLVFD 220 is directly displayed in the display window 206 of the dash board 202, and the second display information set such as the speed meter is displayed as a virtual image by the reflecting mirror 250 through the cover glass 209. Consequently, the digital clock 230 and the second display information set which are displayed on the single FLVFD 220 can be displayed at different positions. Therefore, the driver does not confusingly erroneously recognize the two information sets. As a result, the display device is excellent in recognizability and can improve the appearance. Even when a larger number of display information sets are displayed on the single FLVFD 220, therefore, they can be displayed with excellent recognizability. As a result, the number of display devices which are to be disposed in an automobile can be reduced.

In order to ensure recognizability of each display information, it may be contemplated to arrange display information on the display panel with sufficient margins. In this case, however, a large display device must be used as the FLVFD 220. By contrast, the embodiment attains the effect that recognizability can be improved without particularly increasing the size of the FLVFD 220.

The first and second display information sets which, in the prior art, are to be displayed on separate display devices can be efficiently arranged in the single FLVFD 220, whereby the total area of the FLVFD 220 in which the cost depends on the size of the area can be suppressed. Furthermore, the number of parts such as a driving circuit which, in the prior art, must be disposed for each of different display devices can be reduced, so that the production cost can be lowered.

In the embodiment, the digital clock is used as the first display information set, and the speed meter 232, the fuel gauge 234, and the like are used as the second display information set. The invention is not restricted to this. The display information sets may be adequately changed in accordance with the situation in which the display device is used, and also the design of the automobile.

Alternatively, sheet belt warning, fuel warning, and the like may be set as the third display information set, and displayed on the front face of the display panel, i.e., on the side of the dash board.

As the embodiment described above, when, among the second display information set to be displayed as a virtual image, the residual fuel, and the water temperature, and particularly the speed meter, and the like which are information required for usual driving are displayed, an effect that the driver can recognize such information without largely changing the focal point during driving is attained.

In the embodiment, the FLVFD 220 is used as the display panel. A display device of another kind which can display information on two faces, for example, a liquid crystal display device, an electro chromic display device, or a plasma display device may be used.

According to the display device of the third embodiment, the device comprises a display panel which displays first and second display information sets on a front face and displays information sets which are horizontal inversions of the first and second display information sets on a rear face; the first display information set is displayed on the front face of the display panel while covering a region of the front face, the region corresponding to the second display information set; and the horizontally inverted second display information set is displayed on the rear face of the display panel while covering a region of the rear face, the region corresponding to the first display information set, and the displayed information set is projected onto a reflecting mirror disposed on the side of the rear face of the display panel, thereby displaying the second display information set as a virtual image. Therefore, the first and second display information sets which are once displayed on the signal display panel are displayed at different positions, and a larger number of kinds of information can be displayed with excellent recognizability by the single display panel.

According to the other display device of the third embodiment, in addition to the effect same as that described above, it is possible to attain an effect that the third display information set is displayed on the front face of the display panel and as a virtual image.

When the display device is used in a vehicle, information other than the running state of the vehicle is displayed on a first display portion which conducts a direct display, and the running state of the vehicle is displayed on a second display portion. According to this configuration, information which is usually required during driving can be obtained as a virtual image which can be easily seen during driving.

[Fourth Embodiment]

Hereinafter, a fourth embodiment of the invention relates to the two-sided display unit and will be described with reference to the FIG. 13.

Figure 13:
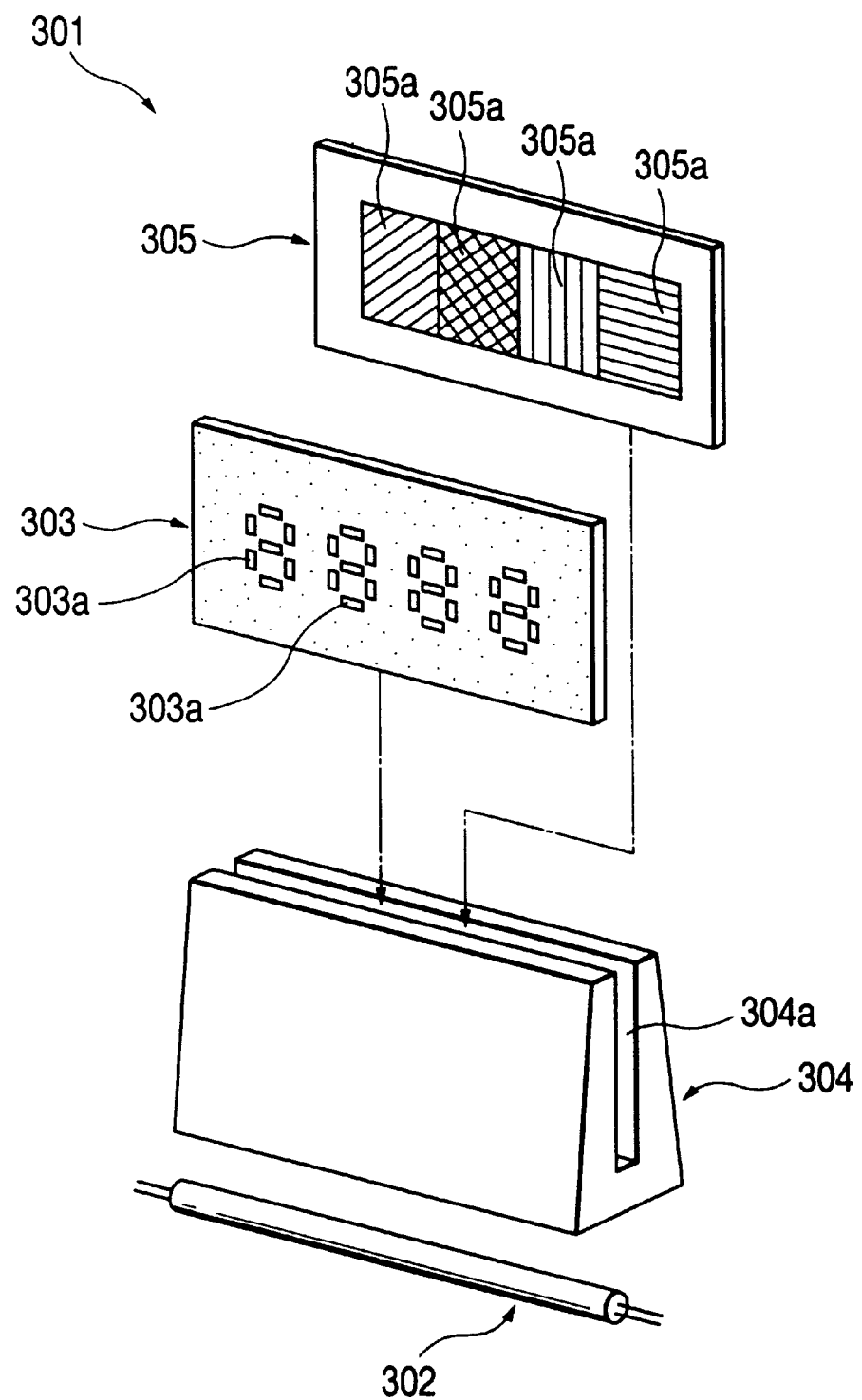
FIG. 13 is an exploded perspective view showing a fourth embodiment.

Referring to FIG. 13, a two-sided display unit 301 has: a light source 302 including a cold-cathode tube having plural color spectra; an attenuation filter 303 which is constituted by a liquid crystal and in which a light transmittance can be partly changed by an external electrical signal or the like; a transparent light guide plate 304 which guides light emitted from the light source 302 to the front and rear faces of the attenuation filter 303, and which is made of a material having a high light transmittance, such as a methacrylic resin plate or an acrylic resin plate; and a color filter 305 which selectively allows a part of the color spectra of the light source 302 to be transmitted therethrough.

The light guide plate 304 has a housing groove 304a which houses the attenuation filter 303 and the color filter 305, at the center in the thickness direction, and which has a substantially U-like section shape. The light source 302 is disposed so as to elongate along an end face of the light guide plate 304 in its longitudinal direction.

In the attenuation filter 303, display patterns 303a which conduct a predetermined display by changing the light transmittance are formed in the center portion. The portion of the filter 303 other than the display patterns 303a is nontransparent.

In the color filter 305, color filter portions 305a each of which allows a desired color such as red, yellow, or green to be transmitted therethrough are formed so as to respectively correspond to the display patterns 303a of the attenuation filter 303. The attenuation filter 303 and the color filter 305 are housed in the housing groove 304a of the light guide plate 304 while overlapping with each other.

The display unit has an appropriate case for accommodating the light guide plate 304 in which the attenuation filter 303 and the color filter 305 are housed, and the light source 302.

In the thus configured embodiment, light emitted from the light source 302 is guided by the light guide plate 304 to the front and rear faces of the attenuation filter 303 and then transmitted through the color filter portions 305a of the color filter 305 and the display patterns 303a of the attenuation filter 303. The transmitted light is projected as display light onto the front and rear face sides of the light guide plate 304, with the result that the same display patterns 3a are seen from both the front and rear face sides of the light guide plate 304.

When the light transmittances of the display patterns 3a of the attenuation filter 303 are adequately selected and changed, a display according to colors of the filter of the color filter portions 305a of the color filter 305 can be obtained. Consequently, the display unit can conduct a colorful display.

As described above, in the attenuation filter 303 which is not self luminous such as a liquid crystal or the like, the display unit has a configuration which is provided with a back light, and recognizes the display patterns 303a in the form of transmitted light. Since parts which are not a self-luminous element such as a fluorescent display tube are used, it is possible to provide the light emitting two-sided display unit 301 which is further inexpensive.

Alternatively, the display unit may have a configuration in which the color filter 305 is not used. In the alternative, the display color of the display patterns 3a depends on the color of the light source 302. In the above, the configuration in which the color filter 305 is separately disposed has been described. Alternatively, a color filter may be printed on the surface of the attenuation filter 303.

In this case, preferably, the display patterns 303a are configured by graphics which, even when horizontally inverted, do not produce a problem, in place of characters or numerals which, when horizontally inverted, are displayed in different manners.

[Fifth Embodiment]

Figure 14:
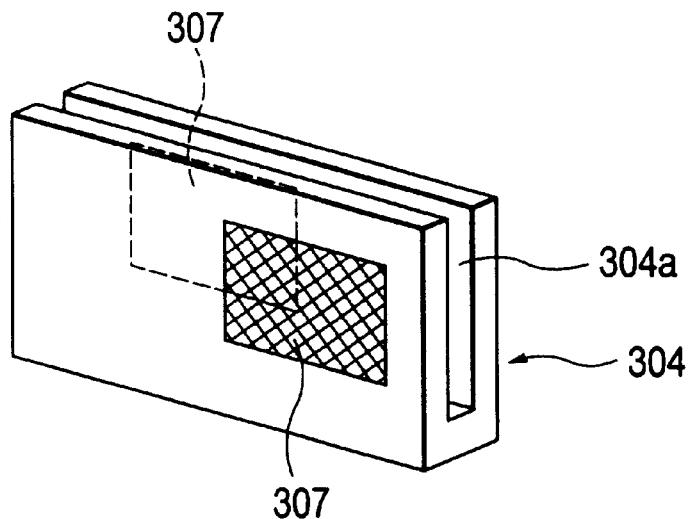
FIG. 14 is a perspective view of a light guide plate used in a fifth embodiment.

Hereinafter, a fifth embodiment of the invention relates to the two-sided display unit as well as the fourth embodiment and will be described with reference to the FIG. 14. The same components as those of the fourth embodiment are designated by the same reference numerals, and their description is omitted.

Masks 307 are disposed on the front and rear faces of the light guide plate 304 and partly shield the attenuation filter 303, respectively, in order to select the display patterns 303a to be seen from the front side of the attenuation filter 303 and the display patterns 303a to be seen from the rear side of the attenuation filter 303, among the display patterns 303a formed in the attenuation filter 303, in a required manner.

In the embodiment, the masks 307 are configured by a surface treatment for scattering light. Specifically, the masks 307 are configured by the so-called ground glass process so as to have fine irregularities. Therefore, a structure which does not require an additional special part and in which light transmitted through the masks 307 is scattered so as to prevent the display contents from being recognized is realized.

[Sixth Embodiment]

Figure 15:
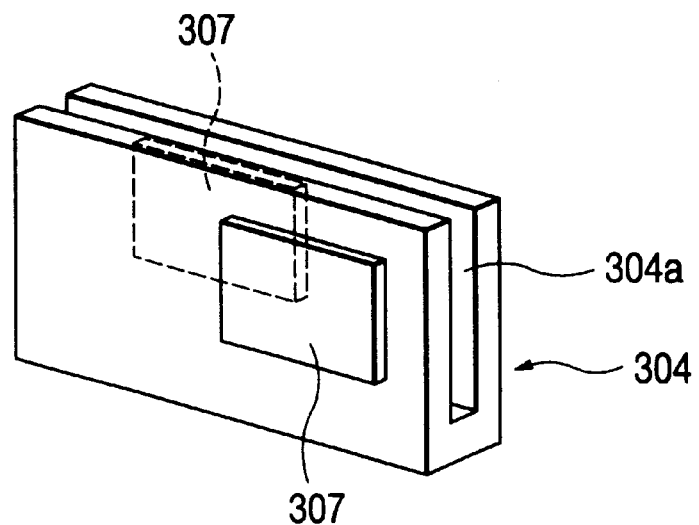
FIG. 15 is a perspective view of a light guide plate used in a sixth embodiment.

Hereinafter, a sixth embodiment of the invention relates to the two-sided display unit as well as the fourth and fifth embodiments and will be described with reference to the FIG. 15. The same components as those of the fourth and fifth embodiments are designated by the same reference numerals, and their description is omitted.

Each of the masks 307 is configured by a reflecting plate, and disposed at a desired position of the light guide plate 304 by, for example, bonding using an adhesive such as an acrylic resin adhesive. Each mask 307 blocks transmission of light toward the side in which the mask is disposed, and reflects light toward the opposite side, thereby exhibiting a function of enhancing the intensity of light emission toward the opposite side. Consequently, light can be effectively used.

As described above, according to the fifth and sixth embodiments, each mask 307 blocks the light emission of the display patterns 303a toward the side of the mask 307 at the position of the mask 307, thereby restricting the side from which the display patterns 303a can be seen. Even when characters or numerals are used, therefore, the display of their inversions can be effectively restricted, and hence a normal display can be easily obtained.

[Seventh Embodiment]

Figure 16:
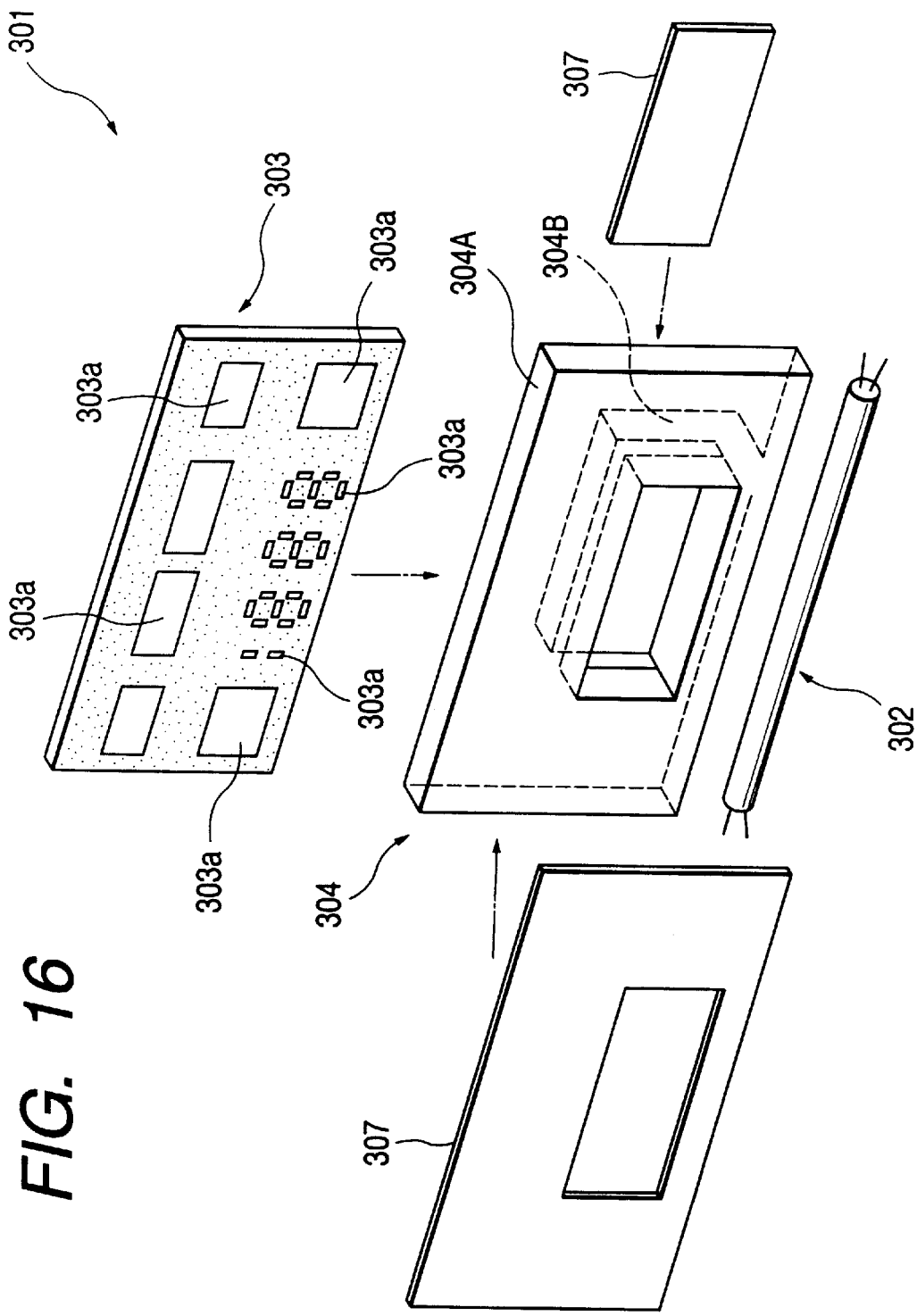
FIG. 16 is an exploded perspective view showing a seventh embodiment.

Hereinafter, a seventh embodiment of the invention relates to the two-sided display unit as well as the fourth to sixth embodiments and will be described with reference to the FIGS. 16 and 17. The same components as those of the fourth to sixth embodiments described above are designated by the same reference numerals, and their description is omitted.

The light guide plate 304 consists of a first light guide plate 304A and a second light guide plate 304B which are fixed to each other by screws or bonding using an adhesive such as an acrylic resin adhesive.

Each of the first and second light guide plates 304A and 4B is configured so as to have a shape corresponding to the predetermined display patterns 303a of the attenuation filter 303, in order to guide light from the light source 302 to the side which is opposite to the side from which the display patterns 303a is to be seen. A mask 307 is attached by bonding or the like to one face of each of the light guide plates 304A and 304B which face is not opposed to the attenuation filter 303, so as to enhance the intensity of light to be transmitted through the display patterns 303a. Each mask 307 consists of a reflecting plate having a shape corresponding to the display patterns 303a.

[Eighth Embodiment]

Figure 18:
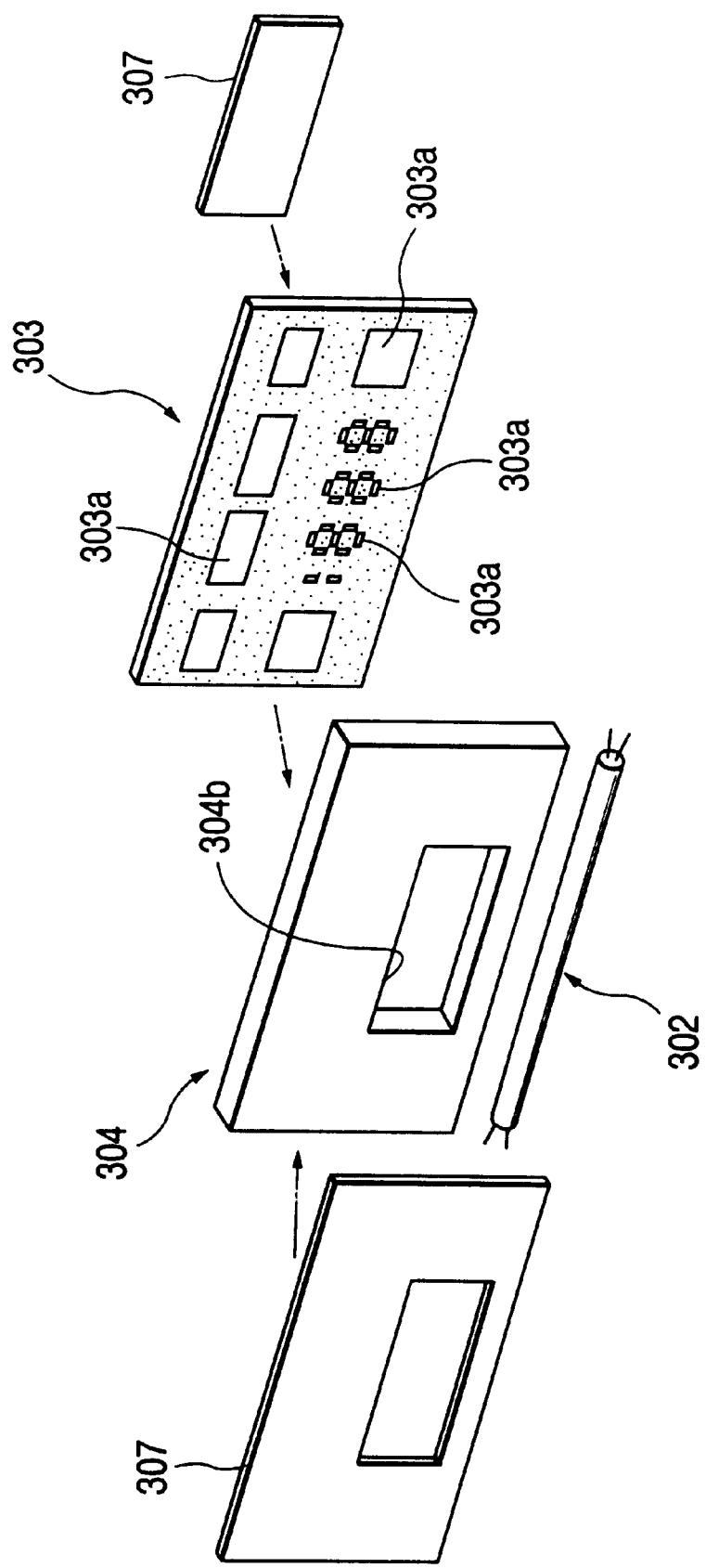
FIG. 18 is an exploded perspective view showing a eighth embodiment.

Hereinafter, a eighth embodiment of the invention relates to the two-sided display unit as well as the fourth to seventh embodiments and will be described with reference to the FIGS. 18 and 19. The same components as those of the fourth to seventh embodiments described above are designated by the same reference numerals, and their description is omitted.

The light guide plate 304 is disposed only on one face of the attenuation filter 303. A mask 307 is attached by bonding or the like to the other face of the attenuation filter 303. The mask 307 consists of a reflecting plate for reflecting light leaking from end faces of an opening 304b of the light guide plate 304.

Another mask 307 which similarly consists of a reflecting plate is attached by bonding or the like to the other face of the light guide plate 304.

Light leaking from the end faces of the opening 304b of the light guide plate 304 is reflected by the mask 307, thereby enabling a display of the corresponding display patterns 303a to be seen from one side. By contrast, light emitted from the light guide plate 304 is transmitted through the corresponding display patterns 303a of the attenuation filter 303, thereby enabling a display of the display patterns 303a to be seen from the other side.

[Ninth Embodiment]

Figure 20:
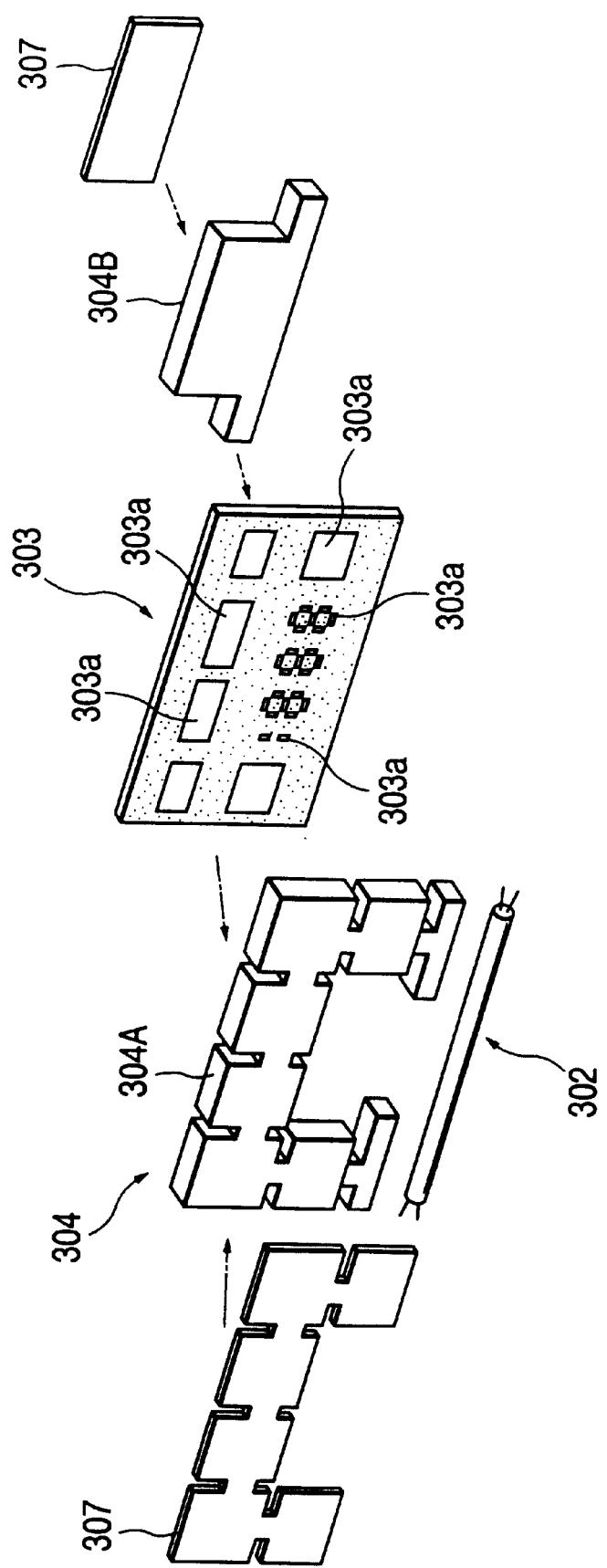
FIG. 20 is an exploded perspective view showing a ninth embodiment.

Hereinafter, a ninth embodiment of the invention relates to the two-sided display unit as well as the fourth to eighth embodiments and will be described with reference to the FIG. 20. The same components as those of the fourth to eighth embodiments described above are designated by the same reference numerals, and their description is omitted.

The light guide plate 304 consists of a first light guide plate 304A and a second light guide plate 304B. Each of the first and second light guide plates 304A and 304B is configured so as to have a shape corresponding to the predetermined display patterns 303a of the attenuation filter 303, in order to guide light from the light source 302 to the side which is opposite to the side from which the display patterns 303a is to be seen. A mask 307 is attached to one face of each of the light guide plates 304A and 304B which face is not opposed to the attenuation filter 303, so as to enhance the intensity of light to be transmitted through the display patterns 303a. Each mask 307 consists of a reflecting plate having a shape corresponding to the display patterns 303a.

The display patterns 303a may be adequately configured by characters or graphics, and are not restricted to those of the embodiments.

As described in fourth to ninth embodiments, the two-sided display unit of the invention has: a light source having plural color spectra; an attenuation filter in which a transmittance for light emitted from the light source can be partly changed by an external signal; and a transparent light guide plate which guides light emitted from the light source to at least one of front and rear faces of the attenuation filter. Therefore, the invention can provide a two-sided display unit by using parts which are not a self-luminous element such as a fluorescent display tube, and hence has an advantage that a light emitting two-sided display unit can be provided at a lower cost.

When a configuration in which a color filter is disposed on at least one of the front and rear faces of the attenuation filter, the color filter selectively allowing a part of the color spectra of the light source to be transmitted through the color filter is employed, there is an advantage that a colorful display can be conducted.

When a configuration in which a mask which partly shields the attenuation filter is disposed on the light guide plate, thereby selecting a display pattern to be seen from a front face side of the attenuation filter and a display pattern to be seen from a rear face side of the attenuation filter, among display patterns formed in the attenuation filter, in a required manner is employed, there is an advantage that, even when numerals, characters, or the like are to be displayed, the display can be normally conducted without producing a problem.

When a configuration in which the mask consists of a reflecting plate is employed, there is an advantage that the mask exhibits not only a mere masking function but also a function of effectively using light so as to enhance the light emission toward the opposite side.

[Tenth Embodiment]

Figure 21:
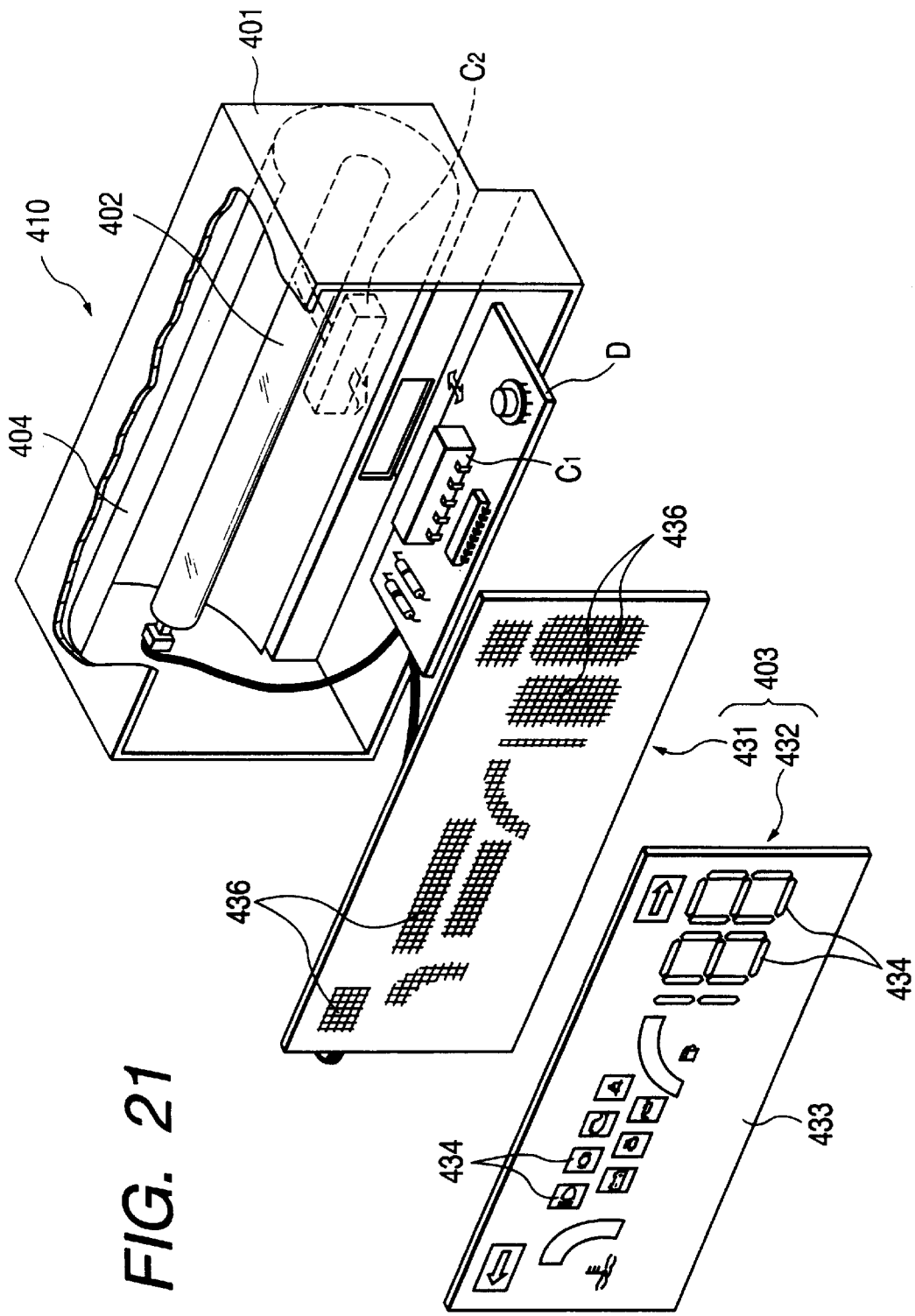
FIG. 21 is an exploded perspective view showing a display device of tenth embodiment.
Figure 22:
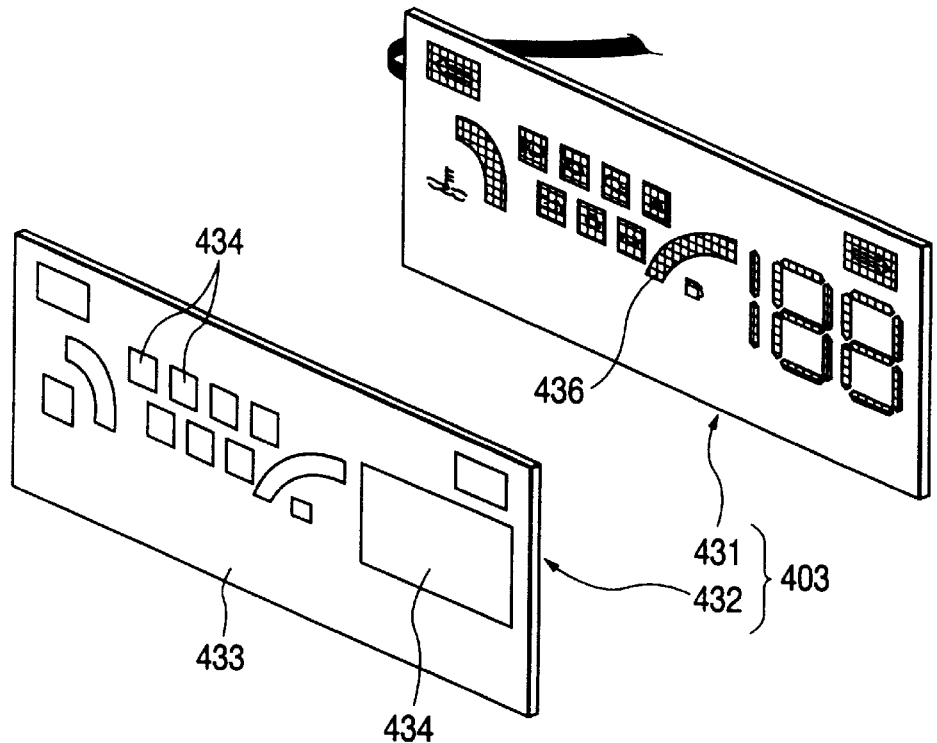
FIG. 22 is a perspective view showing a display panel of a tenth embodiment.
Figure 24:
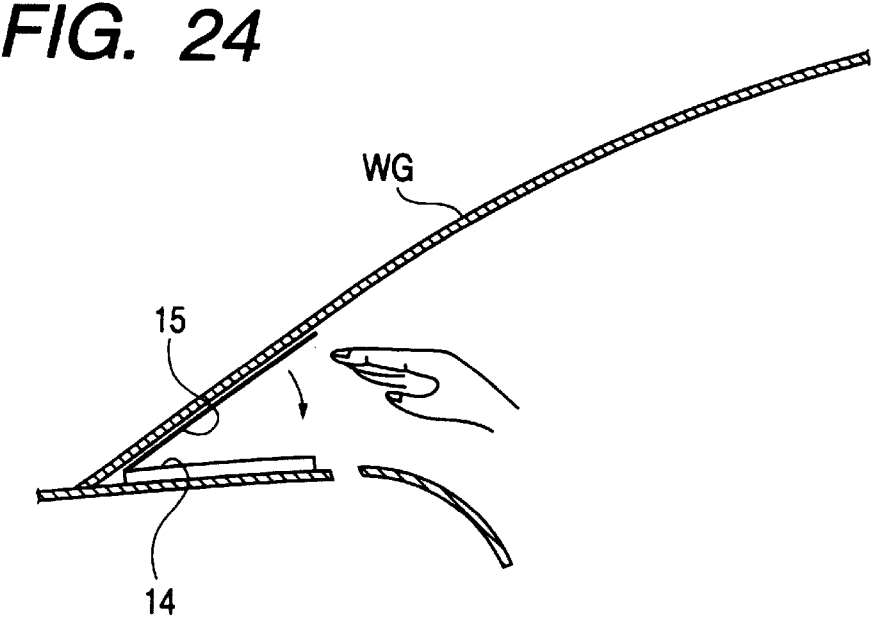
FIG. 24 is a diagram showing a problem of a related art example.

Hereinafter, a tenth embodiment will be described with reference to the FIGS. 21 and 22. Each embodiment is a display device which is used as an instrument panel for an automobile.

For example, the display contents include measurement indications such as a speed meter, a fuel gauge, and an engine temperature gauge, and displays such as parking brake warning, a high-beam pilot lamp, and oil pressure warning.

In the tenth embodiment, in order to simplify the structure of the display device, the measurement displays are conducted not by mechanical meters having a pointer described in the column of the related art, but by plate-like display panels in which patterns of display contents are electrically controlled so to be lit or not to be lit.

In the embodiment, the display panel is configured by an attenuation filter panel, and a color filter panel into which a color filter is incorporated, as described later.

In the display device, as shown in FIG. 19, a light source 402 is disposed in a rectangular parallelepiped case 401 so as to elongate in the longitudinal direction of the case. One of the faces of the case which elongate along the light source 402 is opened, and the display panel 403 is attached to the opened portion. As the light source 402, a light emitting device which emits light of plural color spectra is used. Specifically, the light source is a vacuum fluorescent display tube, an electroluminescent device, or the like. In the embodiment, a fluorescent display tube was used. A reflecting plate 404 is disposed at a position which opposes the display panel 403 across the light source 402, so as to reflect light which is emitted from the light source 402 to the reflecting plate 404, toward the display panel 403.

In the display panel 403, the attenuation filter panel 431 and the color filter panel 432 which are described above are arranged in this sequence with starting from the inner side of the case 401.

The attenuation filter panel 431 is a panel in which the transmittance for light is changeable. Regions 436 which respectively correspond to patterns of display contents are set on the panel. The optical transparent/opaque states of the regions 436 are electrically controlled so that the display contents are respectively set to be lit or not to be lit. In the embodiment, the panel is an inexpensive liquid crystal panel of a monochromatic display system. In the figure, the character D designates a control board for the liquid crystal panel.

In the color filter panel 432, color filters 434 are formed in a resin plate 433 in patterns (such as characters and symbols) of predetermined display contents. Each of the color filters 434 selectively allows light specific to the filter among various kinds of light emitted from the light source 402, to be transmitted through the filter, thereby conducting a color display.

In a process of assembling the display device 410, the control board D for the liquid crystal panel is slid in parallel with the bottom face of the case 401 and housed in the case 401 while a connector $C_1$ is connected to an external harness connector $C_2$. The thus configured display device 410 operates in the following manner.

When the light source 402 emits light, the light is directed to the attenuation filter panel 431. In the attenuation filter panel 431, the light transmittances of the regions 436 are electrically changed so that the respective regions are transparent or opaque, thereby making display/non-display states.

The light which has been transmitted through the attenuation filter panel 431 proceeds to the color filter panel 432. The color display according to the color of the corresponding color filter 434 is conducted by light of a wavelength which can be transmitted through the color filter 434.

In this configuration, the display device can be formed only by three parts, i.e., the light source 402, the attenuation filter panel 431, and the color filter panel 432 unlike a conventional mechanical meter having a pointer which requires several tens of small parts.

In an another example of the tenth embodiment, the case, the light source, and the reflecting plate are configured in the same manner, but the display panel 403 is configured in a different manner.

The patterns of the display contents are formed in the following manner. In the attenuation filter panel 431, as shown in FIG. 22, the patterns of the display contents are formed by means of optical transparent/opaque states. In the color filter panel 432, color filters 434 each for one color are formed so as to respectively correspond groups of the display pattern regions which are formed on the attenuation filter panel 431.

For example, a display of numerals "188" of the speed meter shown in the figure is conducted in the following manner. In the attenuation filter panel 431, small display patterns of numerals "1," "8," and "8" are formed by means of optical transparent/opaque states. In the color filter panel 432, in order to display the group of the numerals "188" in one color, a single color filter 434 is formed in a region which covers the whole of the numerals "188."

In this configuration, the color filters 434 of the regions can be roughly formed, and hence can be easily produced.

According to the tenth embodiment, it is possible to economically realize a color display which gives a high-grade image while using a simple configuration, in a display for measurement, warning, or the like in an automobile, a ship, an airplane, and the like.

What is claimed is:

1. A display device for a vehicle comprising:
    a display unit displaying a display image on front and rear face sides thereof, said display images displayed on the front and rear face sides being a mirror image relationship with each other; and
    an optical member for inverting said display image displayed on the rear face side;
    wherein said display image displayed on the front face side is directly seen by a driver, and said display image displayed on the rear face side is (1) inverted by said optical member, so as to be seen in the same direction of said display image displayed on the front face side and (2) projected onto a combiner or a windshield glass,
    wherein the projection of the inverted image is controlled by changing the reflectivity of the optical member.

2. A display device for a vehicle according to claim 1, wherein a liquid crystal film is disposed on said optical member, and the reflectivity of said optical member is changed by changing the light transmittance of said liquid crystal film.

3. A display device for a vehicle according to claim 1, further comprising: a luminance changing means for changing a luminance of a part or a whole of said display images.

4. A display device for a vehicle according to claim 1, further comprising: a blinking means for causing a part or a whole of said display images to blink.

5. A display device for a vehicle according to claim 1, wherein said display images further comprises a third display image, said third display image being directly seen on the front face side and indirectly seen by an optical member.

6. A display device for a vehicle according to claim 1, wherein said display unit is comprised of a front-light-emitting fluorescent display tube.

7. A display device for a vehicle according to claim 1, in which said display device is used as a display device for a vehicle, a running state of the vehicle is displayed as the second display information set, and information other than the running state of the vehicle is displayed as the first display information set.

8. A display device for a vehicle according to claim 1, wherein the optical member includes a mirror.

9. A display device for a vehicle according to claim 8, wherein the optical member includes a lens.

10. A display device for a vehicle according to claim 1, wherein the optical member includes a lens.

11. A display device for a vehicle according to claim 1, wherein the display image displayed on the rear face can be selected by changing the luminance of different portions of the display image.

12. A display device for a vehicle according to claim 1, wherein different portions of the display images have different luminance.

13. A display device according to claim 1, wherein said display unit is in an instrument panel of the vehicle, said display image displayed on said rear face side being emitted through an opening in said instrument panel and then projected onto the combiner or the windshield glass.

14. A display device for a vehicle comprising:
    a display unit displaying a display image on front and rear face sides thereof, said display images displayed on the front and rear face sides being in mirror image relationship with each other;
    an optical member for inverting said display image displayed on the rear face side; and
    a liquid crystal shutter disposed one of said front and rear face sides, said liquid crystal shutter controlling the luminance of the one of said face sides to control the information being displayed by the one of said face sides;
    wherein said display image displayed on the front face side is directly seen by a driver, and said display image displayed on the rear face side is (1) inverted by said optical member, so as to be seen in the same direction of said display image displayed on the front face side and (2) projected onto a combiner or a windshield glass.

15. A display device for a vehicle according to claim 14, wherein said liquid crystal shutter is a light scattering type liquid crystal shutter.

16. A display device for a vehicle according to claim 1, wherein a warning indication is incorporated into said display images.

* * * * *